Figure 4:
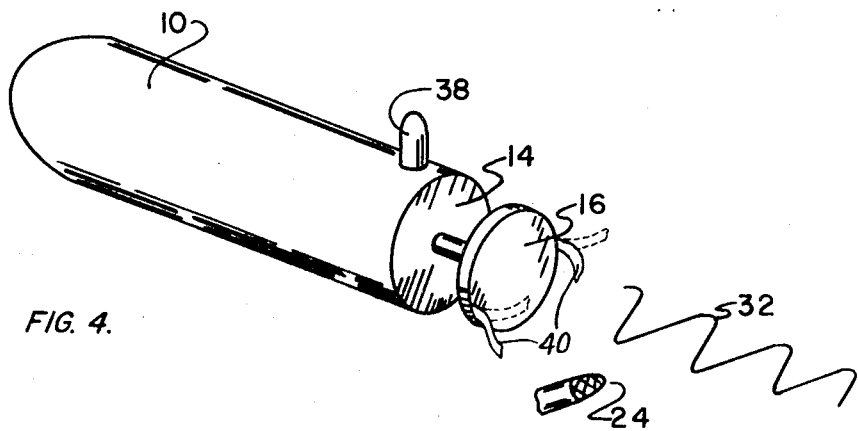

United States Patent

White

[15] 3,650,152
[45] Mar. 21, 1972

[54] APPARATUS AND METHOD FOR MEASURING THE VELOCITY OF A FLOWING FLUID

[72] Inventor: Douglas F. White, Bedminster, N.J.

[73] Assignee: American Standard Inc., New York, N.Y.

[22] Filed: Feb. 13, 1968

[21] Appl. No.: 705,061

[52] U.S. Cl. .................................................... 73/194 B
[51] Int. Cl. ............................................. Golf 1/00
[58] Field of Search .................................... 73/194 B

[56] References Cited

UNITED STATES PATENTS 2,809,520  10/1957  Richard .............................. 73/194
3,116,639  1/1964   Bird .................................... 73/194

OTHER PUBLICATIONS

Mair, W. A.: " The Effect of a Rear-Mounted Disc on the Drag of a Blunt-Based Body of Revolution," The Aeronautical Quarterly Vol. XVI November 1965, pp. 350– 360

Primary Examiner—Richard C. Queisser
Assistant Examiner—Herbert Goldstein
Attorney—Sheldon H. Parker and Tennes I. Erstad

[57] ABSTRACT

A cylindrical body having a curved nose at one end and a flat base at the other end is connected to a disc of smaller diameter, with the disc being centered coincident with the longitudinal axis of the body and being spaced axially from the base thereof. This assembly, when aligned axially at midstream of a flowing fluid with the nose pointed upstream, generates a downstream wake in which the fluid traces an unsteady, irregular flow pattern, oscillatory in nature but with random, unpredictable variations and extinctions in the amplitude and frequency thereof. Modification of the assembly by an additional element of structure which splits or obstructs the fluid flow at or downstream from the space between the base and disc stabilizes the wake flow pattern into a fixed plane of strong oscillations the amplitude and frequency of which are readily measured. The frequency of the stabilized oscillations varies directly with the volumetric velocity of the fluid flow over a considerable range of velocities, whereby the modified assembly constitutes a simpler, linear, no-moving parts, digital-output flowmeter by which the fluid flow velocity can be readily measured with high precision.

12 Claims, 8 Drawing Figures

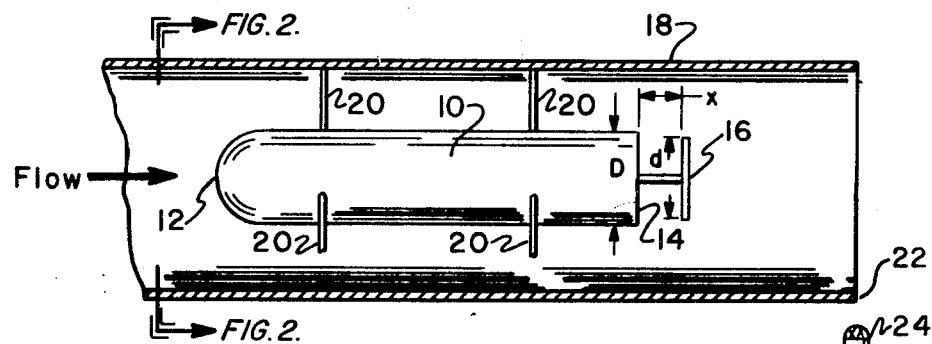
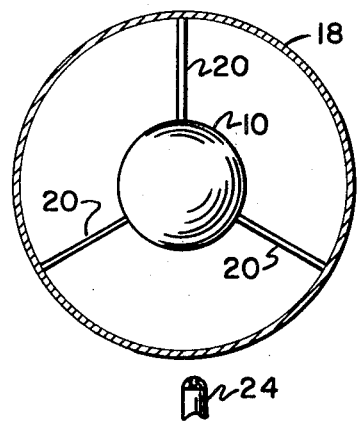
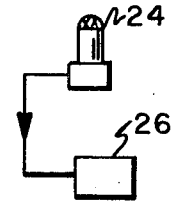
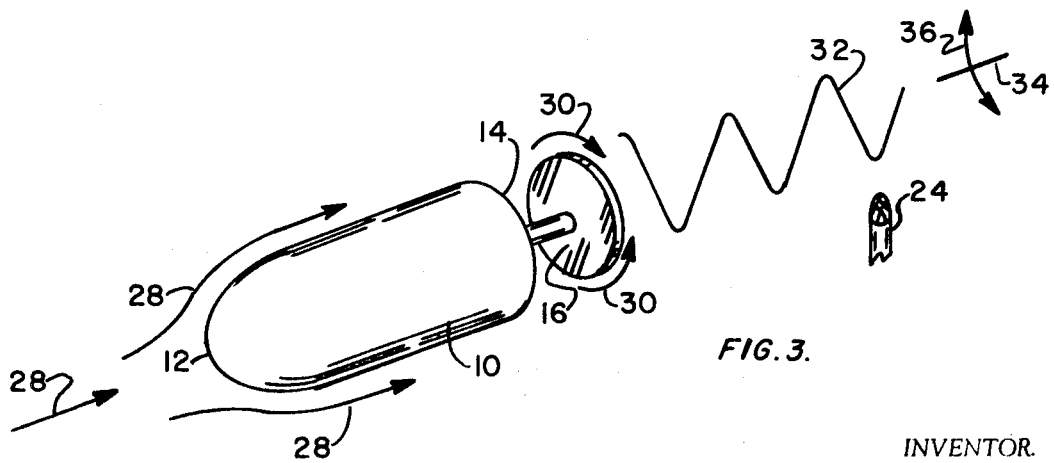
INVENTOR.
Douglas F. White
BY Sheldon H Parker

APPARATUS AND METHOD FOR MEASURING THE VELOCITY OF A FLOWING FLUID

In an article published in Nov. 1965 at page 350 of the Aeronautical Quarterly, W.A. Mair describes experiments in which a flat disc was attached to the downstream, flat-based end of a curved-nosed circular cylindrical body for the purpose of reducing the body drag when the assembly was placed in a relatively low speed wind tunnel. Mair reported that the drag could be increased or decreased depending on the axial spacing of the disc from the cylindrical body. In the high drag region, Mair also reported observing the fluid flow in the cavity between the base of the body and the disc to be severely unsteady and characterized by a signal having a predominant frequency for a given value of air stream velocity.

In studying Mair's work, it was postulated that the basic assembly of the cylindrical body and appended downstream disc could possibly be used as a flowmeter by measuring the frequency of the unsteady flow observed by Mair and correlating the frequency to the velocity of the flowing fluid. In exploring this concept, an apparatus similar to that used by Mair was constructed and, with the apparatus placed concentrically in a pipe and its nose pointed upstream, measurements were made upon the characteristics of the so-called unsteady flow observed by Mair. In general, these investigations confirmed Mair's report of an unsteady oscillatory-type flow generated in the vicinity and downstream of the cavity between the base of the body and the appended disc. However, it was also learned that the signal detected was not stable inasmuch as the frequency and amplitude of the oscillations detected at various velocities of fluid flow could not always be measured and, in general, could not be accurately correlated to the fluid flow velocity. In other words, there were too many unpredictable variations in the Strouhal number over a considerable range of Reynolds numbers and consequently measurement of the oscillatory flow could not be practically utilized for adaptation of the apparatus as a flowmeter.

In accordance with the invention, it has been discovered that an apparatus of the type described can be modified so as to make it capable of generating strong stabilized oscillations in the downstream wake which are not subject to the random variations and fluctuations of the unmodified apparatus. More specifically, it has been found that modification of the apparatus by an additional structural element which splits or obstructs the fluid flow stream at a point adjacent to or downstream of the cavity between the base of the cylindrical body and the disc stabilizes the oscillations in the downstream wake by causing the oscillatory fluid flow to maintain itself in a plane which is fixed in angular position relative to the central longitudinal axis of the apparatus. This eliminates the unpredictable, random variations previously mentioned, so that the oscillatory flow pattern can be easily and reproducibly measured for a given velocity of fluid flow. Moreover, the Strouhal number for the stabilized oscillatory flow has been found to be substantially constant over a considerable range of Reynolds numbers. Thus, in the stabilized oscillatory flow produced by the present invention, the frequency of oscillation is directly proportional to the fluid flow velocity over a substantial range of velocities and therefore the modified apparatus has excellent utility as a flowmeter which provides the advantages of simplicity, linearity, a digital output, no-moving-parts and very little pressure drop in the mean axial flow of the fluid moving by the relatively small obstruction that is constituted by the modified apparatus.

Furthermore, only a simple and inexpensive sensor is needed to detect the frequencies to thereby determine the flow velocity. As a matter of fact, the applicant has utilized relatively unsophisticated equipment consisting of a conventional microphone and electronic counter to easily detect the strong signal issued by the stabilized oscillations that are produced by the apparatus of the invention. Accordingly, the invention provides both a unique form of apparatus and a method for determining the volumetric velocity of fluid flow with a high degree of precision using a relatively simple and inexpensive system.

Figure 5:
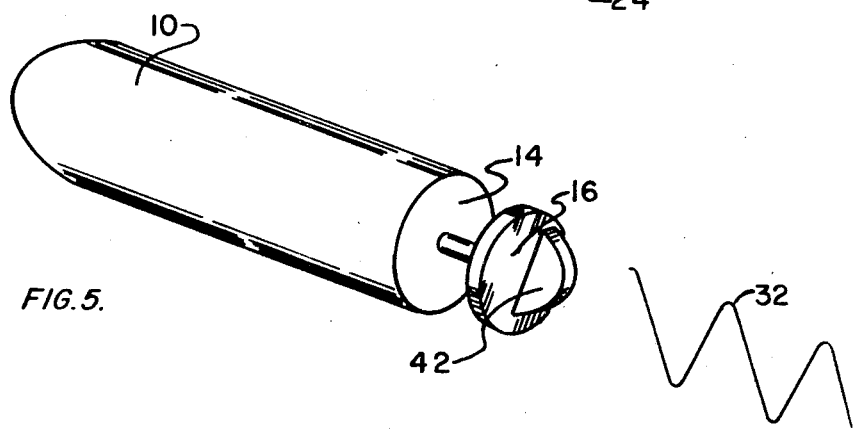
Figure 6:
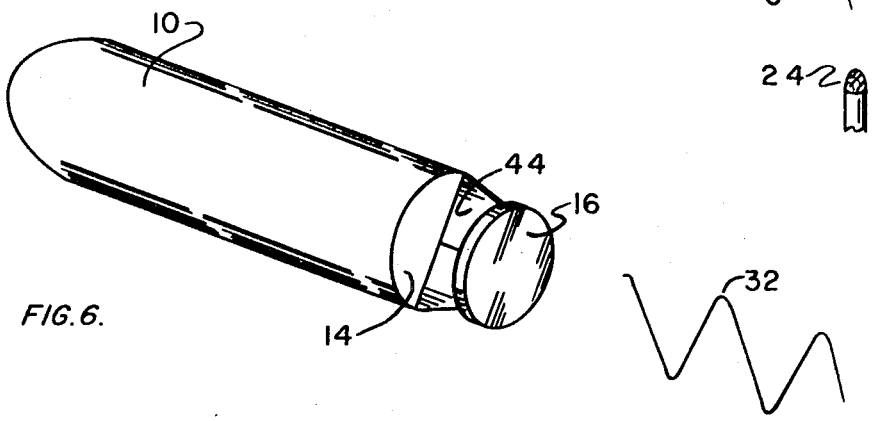
Figure 7:
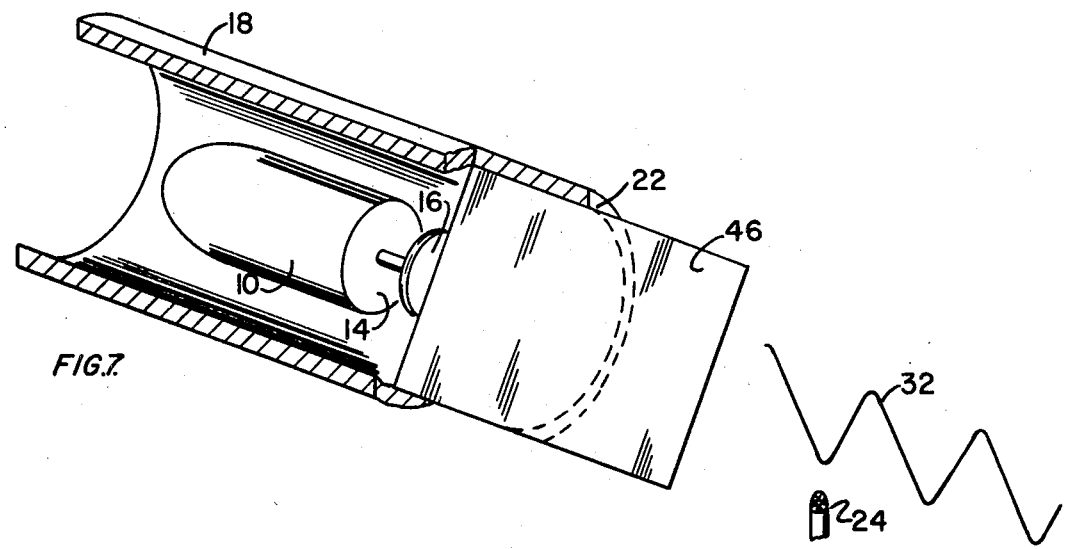
Figure 8:
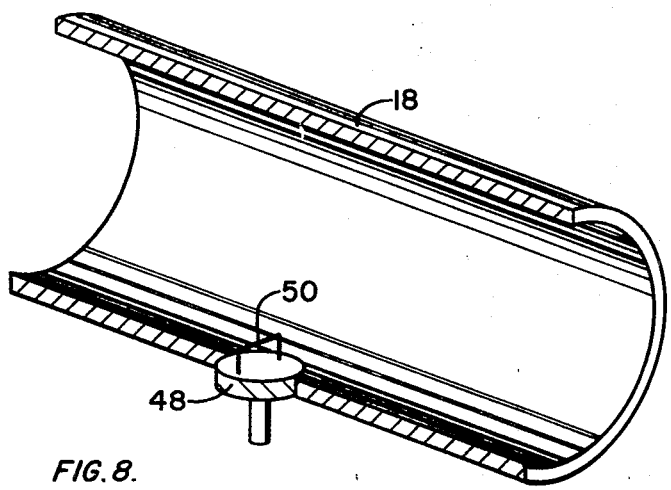

Further details of the invention will be readily understood by reference to the accompanying drawings of which:

FIG. 1 is a side view partly in section of an apparatus which can be useful as a flowmeter when modified in accordance with the invention, FIG. 2 is a cross-sectional view taken along line 2—2 of FIG. 1, FIG. 3 is a perspective view of the essential components of the FIG. 1 apparatus when not modified by the invention and therefore generating unstable downstream oscillations, FIG. 4 is a perspective view showing the apparatus of FIG. 3 modified in one way by the invention to produce stabilized oscillations, FIG. 5 is a perspective view showing the FIG. 3 apparatus modified by the invention in a second way to produce stabilized oscillations, FIG. 6 is a perspective view showing the FIG. 3 apparatus modified by the invention in a third way to produce stabilized oscillations, FIG. 7 is a perspective view showing the FIG. 3 apparatus modified by the invention in a fourth way to produce stabilized oscillations, and FIG. 8 is a partly sectional and partly perspective view of a suitably mounted sensor for measuring the stabilized oscillations.

Referring now to FIG. 1, the apparatus illustrated therein includes a cylindrical body 10 having a curved nose 12 and a flat base 14 at its opposite end. Attached to the base 14 is a flat disc 16 of smaller diameter "d" as compared to the diameter "D" of the cylindrical body 10. The center of the disc is coincident with the longitudinal central axis of the body 10 and the disc is spaced axially from the base 14 by the distance "x."

The body 10 and attached disc 16 are suspended at the center of a tube 18 by three pairs of thin struts 20 connecting the exterior surface of the body 10 to the interior wall of the tube 18. As illustrated the struts of each pair are aligned in a plane passing through the central longitudinal axis of the body 10 and the three planes of the three pairs of aligned struts are spaced apart angularly by 120°. The nose 12 faces a source of fluid flow (not shown) and is pointed upstream with respect to the fluid flow and the disc 16 is pointed downstream facing the exit end 22 of the tube 18, with the longitudinal axis of the body 10 substantially parallel to the mean axial fluid flow within tube 18. Positioned adjacent and below the exit end 22 is a microphone 24 the output of which is fed to a conventional analyzer and recorder 26 which analyzes and records the pressure changes detected by the microphone 24. The analyzer and recorder 26 may, for example, be a "General Radio Type 1911–A Recording Sound and Vibration Analyzer."

Referring now to FIG. 3 when a fluid such as air is flowed into the tube 18, the flow impinges upon the curved nose 12 of the body 10 and divides as shown by the arrows 28 to flow around and by the obstruction constituted by the body 10. When the fluid flow reaches the space between the disc 16 and flat base 14, it is disrupted or perturbed and as a result a downstream wake is generated in which the fluid flow traces an oscillatory motion as indicated by the arrows 30 and trace line 32.

At any given velocity of fluid flow, the oscillatory motion generated by the FIG. 3 structure is unstable in that the plane in which the oscillation occurs does not remain fixed and instead rotates about the projected central longitudinal axis 34 as indicated by the arrows 36. The rotation of the plane of oscillation is unpredictable both as to magnitude and angular direction at any given velocity or with change in velocity. As a result the microphone 24 at times detects large pressure changes of measured frequency and amplitude and at other times detects random variations in the measured amplitude and frequency of the motion, or even extinction of the frequency and amplitude into the background noise. Thus, the signals detected by the microphone cannot be correlated to the mean flow velocity of the fluid within the tube 18 and the apparatus illustrated in FIGS. 1–3 of the drawings is not practical and useful as a flowmeter.

Referring now to FIG. 4, this illustrates a modification of the apparatus of FIG. 3 made in accordance with the invention. The modification consists of a small cylindrical rod 38 positioned on the exterior surface of the body 10 adjacent the flat base 14 thereof. The longitudinal axis of the rod 38 is coincident with a radius projected from the central longitudinal axis of the body 10. The plug 38 constitutes a further obstruction to the fluid flowing by exterior surface of the body 10 and in effect splits that flow before it reaches the space "x" between the base 14 and disc 16.

As a result of adding the rod 38, the oscillatory flow of the fluid in the downstream wake represented by trace 32 is stabilized in a fixed plane aligned perpendicularly to a plane coincident with the longitudinal axis of the rod. Therefore, the microphone 24 detects stabilized oscillations of large amplitude and uniform frequency at any given velocity in the range of Reynolds numbers from about $10^4$ to $10^5$. The frequency of the stabilized oscillations detected by the microphone is in direct correlation with the mean axial velocity of fluid flow within the tube 18 and therefore the velocity of the fluid flow may be readily measured with high precision within the range specified above.

Further verification of the stabilization of the oscillatory fluid flow in the downstream wake is obtained by attaching two strands of a flexible material 40 at the exit end 22 of disc 16 at opposite ends of a diameter aligned perpendicularly to the plane passing through the central longitudinal axis of rod 38. When the strips of flexible material 40 are illuminated with a stroboscopic pulsed light, obtained for example from a General Radio Type 1531-8 Strobotac electronic stroboscope, while fluid flow is taking place in the tube 18, the strands 40 are seen to flutter back and forth in synchronism in the plane of the diameter connecting them, whereby one of the strands 40 points away from the center of the tube and the other towards the center of the tube as illustrated in full lines in FIG. 4 and alternatively the strips reverse their position in synchronism so that the first one points towards the center of the tube and the second away from the center of the tube. Thus, the oscillations are stabilized in a plane perpendicular to the longitudinal axis of the rod 38 and this stabilization is sustained by the rod throughout the range of flow rates specified above. Since the amplitude and frequency of stabilized oscillations may be readily detected either by microphones or by other sensors, and since the frequency of the oscillations varies directly with the mean fluid flow velocity within the tube 18, the modified apparatus of FIG. 4 constitutes a highly accurate flowmeter by which the volumetric velocity of fluid flow can be readily measured.

Referring to FIG. 5, this illustrates a second modification of the apparatus of FIG. 3 whereby a thin semicircular vane 42 is attached to the downstream side of disc 16 along a diameter thereof. While the vane 42 does not physically split the fluid flow before the flow reaches the space "x" between the base 14 and disc 16, it is nevertheless highly effective to stabilize the oscillatory fluid flow in the downstream wake in a fixed plane coincident with or parallel to the plane of the vane. Hence, the microphone 24 is again enabled to detect the frequency and amplitude of the oscillatory motion in an organized and predictable manner, without the random variations, fluctuations and extinctions that are otherwise experienced with the unmodified apparatus of FIG. 3. Accordingly, the modified apparatus of FIG. 5 also has excellent utility as a flowmeter possessing the advantages previously described.

Referring now to FIG. 6, this illustrates a third modification of the apparatus of FIG. 3 whereby a thin plate 44 divides into two halves the space between the base 14 and disc 16 defined by the peripheries and opposed faces of the base and disc. The plate 44 is attached along diameters of the base 14 and disc 16 lying in the same plane. The plate 44 divides the space between the base 14 and disc 16 into two symmetrical halves and is effective to stabilize the oscillatory fluid flow in the downstream wake in a fixed plane coincident with or parallel to the plate 44 as illustrated by the trace 32. Again, the stabilized oscillations are retained over the entire range of fluid flow velocities previously described and the microphone 24 therefore can readily measure the amplitude and frequency of oscillations for any given velocity and the change in frequency of oscillations with a change in the fluid flow velocity. Therefore, the apparatus of FIG. 6 may also be readily used as a flowmeter to measure the mean axial fluid flow velocity within the tube 18.

Referring now to FIG. 7, this illustrates a fourth modification of the apparatus of FIG. 3 whereby a large flat tail 46 is attached to the downstream side of disc 16 along a diameter thereof. The tail 46 extends along and beyond the attachment diameter up to the interior wall of the tube 18 and also projects out beyond the exit end 22 of the tube. Thus, the tail 46 splits the total fluid flow downstream of the disc 16 into two symmetrical portions each flowing through the hemispherical space lying to one side of the tail 46 and between it and the interior wall of the tube 18. In this particular modification, the oscillatory fluid flow downstream from the space "x" between the base 14 and disc 16 is stabilized in a fixed plane coincident with or parallel to the plane of the tail 46. Therefore, the microphone again is caused to detect the organized frequency and amplitude of the fluid flow oscillations for a given fluid flow velocity within the tube 18 and the microphone readily detects the directly correlated change in frequency of oscillations when the flow velocity is changed. Therefore, over the range of flow velocities previously specified, the modified apparatus of FIG. 7 has excellent utility as a flowmeter having the advantages previously specified.

The ratio of the diameter of the disc to the diameter of the body, i.e., $d/D$, has an effect upon the stabilized oscillatory flow in the various flowmeter structures provided by the invention. This effect will vary further according to the particular modifying structural element that is used to further obstruct or split the fluid flow in order to stabilize the oscillations. However, in general the value of the ratio $d/D$ should be controlled within the range from about 0.6 to about 0.8.

Likewise, the ratio of the distance "x" to the diameter of the body $D$, i.e., $x/D$, will also have an effect upon the stabilized oscillations generated in the flowmeter structures of the invention and the effect of the $x/D$ ratio will further vary according to the particular type of modifying structural element and the $d/D$ ratio that are employed. However, in general, the value of the $x/D$ ratio should be controlled within the range from about 0.28 to about 0.6.

These controls are not critical and essential in the sense that no stabilized oscillations will be generated when the structure of the apparatus is outside the controlled values. Rather, the values recommended above will encompass the relationships of structure in the apparatus of the invention which will give the best results in terms of the measurable amplitude of the stabilized oscillations. All other things being equal, it is more advantageous to maximize the amplitude of the stabilized oscillations at a given velocity and frequency in order to achieve the greatest magnitude of difference between the signal amplitude and the background noise detected by the sensor. In order to achieve such maximum magnitude of difference, the foregoing ranges of values of the ratios $d/D$ and $x/D$ should be used.

Referring to FIG. 8, this illustrates the mounting of a sensor 48 in the wall of tube 18 by screwing the sensor into a threaded hole in the wall at any suitable point downstream of the flowmeter apparatuses described in FIGS. 4–7. The sensor 48 includes a sensing element 50 which is positioned in the path of the fluid flow oscillations generated by the flowmeter apparatus and which may be selected to respond to the changes in fluid pressure and temperature that are caused by the oscillations. For example, the element 50 may be a diaphragm transducer or a piezoelectric crystal for sensing pressure changes, or the element may be a thermistor or a thermocouple for sensing temperature changes. By using a sensor of the form exemplified by FIG. 8 in combination with the flowmeter apparatus of FIGS. 4–7, the flowmeter of the invention may be installed at any desired point along the longitudinal axis of a tube, pipe, conduit or other conductor containing the flowing fluid which is to be measured. The sensors and the apparatus for analyzing and recording the signals from the sensors are well known in the art and fully described in the following U.S. Pats.: Re. 26,410 issued to Chanaud, No. 3,314,289 issued to Rodely, No. 3,370,463 issued to Chanaud, and No. 3,434,344 issued to Brunner.

As described above, the invention provides unique flowmeter apparatuses for measuring the velocity of flowing fluids. These apparatuses, and others by which the invention may be practiced, in general require a fluid oscillation generator composed of an obstruction member which has a central longitudinal axis and a second member which is spaced by a predetermined distance from one end of the obstruction member and aligned in such position that a projection of the central longitudinal axis from the specified end of the obstruction member passes through the second member. The maximum cross section of the second member perpendicular to the projected longitudinal axis must be less than the maximum cross section of the obstruction member perpendicular to its central longitudinal axis, so that when the generator is placed within a flowing fluid with the central longitudinal axis of the obstruction member aligned substantially parallel to the direction of fluid flow and the second end of the obstruction member pointed upstream, oscillations are generated in the motion of the fluid flowing in the wake downstream from the second member. As previously described, these oscillations are of random nature inasmuch as any plane passed through the oscillations will vary randomly in angular position relative to the projected central longitudinal axis of the obstruction member and it is not possible to foretell the magnitude or direction of such variations. Consequently, a sensor placed in any fixed position to detect and measure the oscillations is unable to account for the random variations, nor is it possible to arrange for a movable sensor to follow and track the random variations, so that the fluid oscillation generator per se does not have practical utility as a flowmeter.

The present invention modifies the fluid oscillation generator by adding to it a stabilizer means which acts to stabilize and prevent the objectionable random variations so that any plane passed through the oscillations will remain substantially fixed in angular position relative to the projected central longitudinal axis of the obstruction member. Of greatest importance is the fact that the plane of the stabilized oscillations, that is to say, a plane passed through the entire amplitude of the oscillatory fluid motion, remains substantially fixed in angular position relative to the projected central longitudinal axis of the obstruction. As a result, a suitable sensor can be placed in that fixed position from which it detects the maximum amplitude of oscillations and, due to the stabilization effected by the invention, the resulting optimized signal will be maintained over the entire operating range of the apparatus.

In addition to flowmeter apparatuses as described above, the invention also provides a unique method for measuring the velocity of a flowing fluid. More particularly, determination of the fluid flow velocity according to the invention entails the steps of obstructing a portion of the cross section of a flowing fluid with an obstruction zone having a central longitudinal axis substantially parallel to the axis of mean fluid flow, generating oscillations in the fluid flowing in the downstream wake from the obstruction zone, stabilizing said oscillations in a plane which is fixed in angular position relative to said longitudinal axis, and measuring the frequency and amplitude of said stabilized oscillations. In view of the direct proportionality of the measured frequency to the mean fluid flow velocity, this method reliably measures the flow velocity with high precision.

It will be understood that it is intended to cover all changes and modifications of the preferred embodiments of the invention, herein chosen for the purpose of illustration, which do not constitute departures from the spirit and scope of the invention.

What is claimed is:

1. In a fluid flowmeter device for measuring a parameter of a flowing fluid, which device includes a fluid oscillation generator composed of an elongated obstruction member having a longitudinal axis and a second member spaced by a predetermined distance from the downstream end of said obstruction member, and sensor means responsive to the frequency of the generated fluid oscillations: the improvement comprising stabilizer means for stabilizing fluid oscillations generated by said flowmeter so that the oscillations occur in a predetermined plane, said sensor means being located to respond to the oscillations in the stabilized plane of oscillations.

2. The flowmeter device according to claim 1 wherein said elongated obstruction member is cylindrical and has a curved nose at its upstream end and a flat base at its downstream end, and said second member is a disc having a smaller diameter than the diameter of said cylindrical member, said disc being positioned perpendicularly to and with its center coincident with the aforementioned longitudinal axis.

3. A flowmeter as in claim 2 wherein the ratio of the diameter of said disc to the diameter of said elongated obstruction member has a value within the range from about 0.6 to about 0.8, and the ratio of said predetermined distance to the diameter of said elongated obstruction member has a value within the range from about 0.28 to about 0.6.

4. A flowmeter according to claim 2 wherein said stabilizer means comprises a rod affixed to and extending radially outwardly from the surface of said elongated obstruction member at a location closely adjacent the flat-based end thereof, whereby the aforementioned oscillations are stabilized in a fixed plane substantially perpendicular to the direction taken by said rod.

5. A flowmeter as in claim 2 wherein said stabilizer means comprises a thin vane attached to the downstream side of said disc, said vane being perpendicular to said disc, whereby said oscillations are stabilized in a fixed plane substantially coincident with or parallel to said vane.

6. A flowmeter as in claim 5 wherein said vane is attached to said disc along a diameter of the disc and terminates at opposite ends of said diameter, the remaining periphery of said vane being smoothly curved between said terminal points.

7. A flowmeter as in claim 5 wherein said vane is attached to said disc along a diameter of said disc and extends beyond the opposite ends of said diameter.

8. A flowmeter as in claim 7 wherein the assembly of said elongated obstruction member, disc and vane is mounted within a conductor for flowing fluid, said vane extending beyond the opposite ends of the attachment diameter and to opposite points on the interior wall of said conductor whereby said vane divides a portion of the hollow interior of said conductor into two symmetrical halves downstream from said disc.

9. A flowmeter as in claim 2 wherein said stabilizer means comprises a thin plate attached to said flat base and to the upstream side of said disc in a position coincident with the central longitudinal axis of said elongated obstruction member, the peripheries of said plate being defined by the diameters along which said plate is attached as aforesaid and by lines connecting respectively the opposite pairs of ends of said diameters, whereby said oscillations are stabilized in a fixed plane substantially coincident with or parallel to said plate.

10. A flowmeter as in claim 2 which further includes a hollow cylindrical conductor for said flowing fluid, said obstruction member being suspended within said flowing fluid on the axis of said hollow cylindrical conductor.

11. The flowmeter of claim 1 wherein said longitudinal axis passes through said second member, and the cross-sectional area of said second member perpendicular to said longitudinal axis is less than the cross-sectional area of said obstruction member perpendicular to said longitudinal axis.

12. A flowmeter for measuring the velocity of a fluid by generating fluid oscillations comprising: an obstruction member having a longitudinal axis, a second member spaced by a predetermined distance from one end of said obstruction member so that an extension of said central longitudinal axis from said one end passes through said second member, said second member having a diameter perpendicular to said extended central longitudinal axis less than a parallel diameter of said obstruction member at said one end, stabilizer means adjoining one of said members for stabilizing the orientation of said fluid oscillations producing a substantially fixed plane of oscillation whereby said fluid oscillations are substantially fixed in angular position relative to said longitudinal axis, and measuring means for measuring the frequency of said fluid oscillations, said frequency being directly related to the velocity of said fluid.

* * * * *